US010168415B2

(12) United States Patent
Kanaga

(10) Patent No.: US 10,168,415 B2
(45) Date of Patent: Jan. 1, 2019

(54) POSITION DETERMINING DEVICE AND METHOD, AND KEYLESS ENTRY SYSTEM

(71) Applicant: ALPS ELECTRIC CO., LTD., Tokyo (JP)

(72) Inventor: Mikihiko Kanaga, Miyagi (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/705,528

(22) Filed: Sep. 15, 2017

(65) Prior Publication Data

US 2018/0106882 A1    Apr. 19, 2018

(30) Foreign Application Priority Data

Oct. 19, 2016  (JP) .................................. 2016-205113

(51) Int. Cl.
*H04W 4/02*     (2018.01)
*G01S 5/02*     (2010.01)
(Continued)

(52) U.S. Cl.
CPC .......... *G01S 5/0284* (2013.01); *B60R 25/245* (2013.01); *G01S 11/06* (2013.01);
(Continued)

(58) Field of Classification Search
CPC ............. H04M 1/6075; H04M 1/6091; H04M 1/7253; H04M 1/72533; H04M 2250/12; H04W 4/027; H04W 4/046; H04W 88/02
See application file for complete search history.

(56) References Cited

U.S. PATENT DOCUMENTS 8,130,076 B2    3/2012  Nakajima et al.
2001/0005170 A1*  6/2001  Heide .................. B60R 25/24
                                                        340/5.61
(Continued)

FOREIGN PATENT DOCUMENTS

EP       1408184        4/2004
JP       2007-303167    11/2007
(Continued)

OTHER PUBLICATIONS

Extended European Search Report for 17195725.1 dated Feb. 28, 2018.

*Primary Examiner* — Quan M Hua
(74) *Attorney, Agent, or Firm* — IPUSA, PLLC

(57) ABSTRACT

A position determining device is configured to determine the position of a portable device configured to receive one or more radio signals transmitted from one or more antennas inside a vehicle, respectively. The position determining device includes a processor configured to determine the open or closed state of a door of the vehicle for getting in and out of the vehicle, calculate an evaluation value related to the position of the portable device based on the received signal strength of the one or more radio signals at the portable device, and determine that the portable device is positioned inside the vehicle when the evaluation value satisfies a predetermined condition. The processor is configured to change at least one of the predetermined condition and a method of calculating the evaluation value in accordance with the determined open or closed state of the door.

13 Claims, 11 Drawing Sheets

(51) Int. Cl.
*B60R 25/24* (2013.01)
*G01S 11/06* (2006.01)
*G01S 13/04* (2006.01)
*G07C 9/00* (2006.01)

(52) U.S. Cl.
CPC .......... *G01S 13/04* (2013.01); *G07C 9/00111* (2013.01); *G07C 2209/63* (2013.01)

(56) References Cited

U.S. PATENT DOCUMENTS

2006/0224290 A1 10/2006 Nakashima et al.
2006/0267407 A1* 11/2006 Nagaoka ................. B60R 25/24
 307/10.1
2017/0203721 A1 7/2017 Hamada et al.

FOREIGN PATENT DOCUMENTS

| JP | 2014-043724 | 3/2014 |
| WO | 2016/013402 | 1/2016 |

* cited by examiner

POSITION DETERMINING DEVICE AND METHOD, AND KEYLESS ENTRY SYSTEM

CROSS-REFERENCE TO RELATED APPLICATION

This application is based upon and claims priority to Japanese Patent Application No. 2016-205113, filed on Oct. 19, 2016, the entire contents of which are incorporated herein by reference.

BACK GROUND OF THE INVENTION

1. Field of the Invention

The present invention relates to position determining devices and methods, and keyless entry systems. The position determining devices include a position determining device that determines the position of a portable device relative to a vehicle based on the received signal strength of a radio signal transmitted from an antenna of the vehicle in, for example, a keyless entry system.

2. Description of the Related Art

Keyless entry systems in which vehicle operations such as locking and unlocking the doors and starting the engine of a vehicle are performed based on radio communications between a vehicle-side device and a portable device have been known. In general, the vehicle-side device transmits radio signals of the low-frequency (LF) band (LF radio signals) from multiple antennas provided on the vehicle. The portable device calculates a distance from each antenna based on the received signal strength of the radio signal received from each antenna, and transmits the information to the vehicle-side device through a radio signal of the radio-frequency (RF) band (RF radio signal). The vehicle-side device identifies the position of the portable device based on the distance information obtained from the portable device, and controls the locking and unlocking of the doors of the vehicle based on the identified position. For example, when the portable device is inside the vehicle, the vehicle-side device disables an automatic door locking function to prevent the portable device from being locked inside the vehicle.

Furthermore, according to the device described in Japanese Laid-open Patent Publication No. 2007-303167, in the vicinity of a boundary surface that separates the inside and the outside of a vehicle, the received signal strengths of radio waves transmitted from multiple antennas provided on the vehicle are obtained in advance. A parameter for calculating Mahalanobis distance is calculated based on the data group of the received signal strengths obtained at various points near the inside of the boundary surface (inside data group) to be prestored in a memory. Furthermore, a parameter for calculating Mahalanobis distance is calculated using the data group of the received signal strengths obtained at various points near the outside of the boundary surface (outside data group) to be prestored in the memory. When radio waves from the antennas of the vehicle are received at a portable device, the Mahalanobis distance between the received signal strengths of the radio waves from the antennas and the inside data group is calculated, and the Mahalanobis distance between the received signal strengths of the radio waves from the antennas and the outside data group is calculated, using the parameters prestored in the memory. When the Mahalanobis distance with respect to the inside data group is relatively short, the portable device is determined to be positioned inside the vehicle, and when the Mahalanobis distance with respect to the outside data group is relatively short, the portable device is determined to be positioned outside the vehicle.

SUMMARY OF THE INVENTION

According to an aspect of the present invention, a position determining device is configured to determine the position of a portable device configured to receive one or more radio signals transmitted from one or more antennas inside a vehicle, respectively. The position determining device includes a processor configured to determine the open or closed state of a door of the vehicle for getting in and out of the vehicle, calculate an evaluation value related to the position of the portable device based on the received signal strength of the one or more radio signals at the portable device, and determine that the portable device is positioned inside the vehicle when the evaluation value satisfies a predetermined condition. The processor is configured to change at least one of the predetermined condition and a method of calculating the evaluation value in accordance with the determined open or closed state of the door.

The object and advantages of the invention will be realized and attained by means of the elements and combinations particularly pointed out in the claims.

It is to be understood that both the foregoing general description and the following detailed description are exemplary and explanatory and not restrictive of the invention.

DESCRIPTION OF EMBODIMENTS

Figure 1:
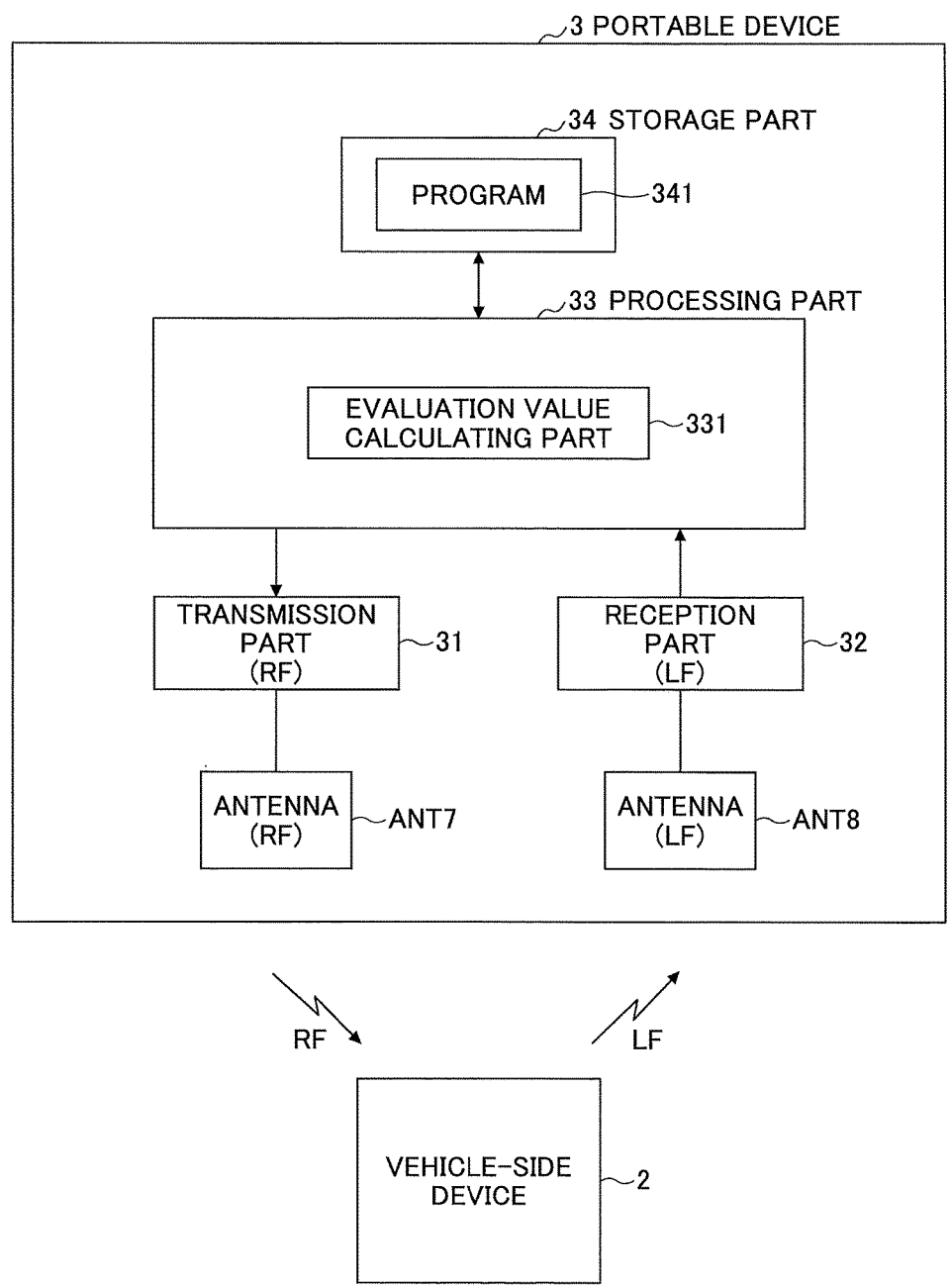
FIG. 1 is a diagram illustrating a configuration of a keyless entry system according to a first embodiment, mainly showing a configuration of a portable device.

Conventional keyless entry systems assume that all the doors of a vehicle are closed, and do not give consideration to the state where a door of the vehicle is open. That is, from the received signal strength of a radio wave received at a portable device when all the doors of the vehicle are closed, the distance between the portable device and each antenna is calculated and the position of the portable device is determined.

The vehicle body is generally made of metal. Therefore, when a door is open, a radio wave is likely to leak outside the vehicle from an antenna positioned inside the vehicle. In this case, the received signal strength of the radio wave transmitted from the antenna inside the vehicle relatively increases. Therefore, the distance between the portable device and the antenna inside the vehicle apparently decreases. As a result, the portable device that is actually outside the vehicle is likely to be wrongly determined to be inside the vehicle.

Recently, passenger cars with a slidable door have adopted the function of enabling the operation of locking the door before the door is completely closed (also referred to as "reservation lock function"). In the case of using this function, a user touches a sensor provided on the door handle or the like during the closure of the slidable door. When the sensor detects the user's touch operation, a radio wave is transmitted from each antenna of the vehicle to determine the position of a portable device. When the portable device is determined to be outside the vehicle, the door is automatically locked when the door is completely closed. According to this reservation lock function, however, a radio wave is transmitted from an antenna with the slidable door being open. Therefore, for the reason stated above, the position of the portable device is likely to be wrongly determined to be inside the vehicle. Once a wrong determination occurs, the door is prevented from being automatically locked, thus significantly impairing convenience.

According to an aspect of the present invention, a position determining device and method that can make an accurate determination even when there is a change in the open or closed state of a door for getting in and out of a vehicle, in the case of determining the position of a portable device in accordance with the received signal strength of a radio signal transmitted from an antenna inside the vehicle are provided. Furthermore, a keyless entry system including such a position determining device is provided.

According to an aspect of the present invention, it is possible to make an accurate determination even when the open or closed state of a door for getting in and out of a vehicle changes in the case of determining the position of a portable device in accordance with the received signal strength of a radio signal transmitted from an antenna inside the vehicle.

Embodiments of the present invention are described below with reference to the accompanying drawings.

First Embodiment

FIG. 1 is a diagram illustrating a configuration of a keyless entry system according to a first embodiment of the present invention. The keyless entry system illustrated in FIG. 1 includes a vehicle-side device 2 mounted on a vehicle 1 (FIGS. 4 through 7) and a portable device 3 that can be carried by a user.

The keyless entry system illustrated in FIG. 1 generally operates as follows. First, when a user having the portable device 3 operates an operation input device 4 (such as a door open/close button or an engine start button) (FIG. 3) of the vehicle 1, the vehicle-side device 2 of the vehicle 1 transmits a request signal Rq of the LF band (LF request signal Rq) to the portable device 3. In response to receiving this request signal Rq, the portable device 3 transmits a response signal An of the RF band to the vehicle-side device 2. Based on the response signal An received from the portable device 3, the vehicle-side device 2 executes an authentication process to determine whether the portable device 3 is pre-registered. If the portable device 3 is pre-registered, predetermined vehicle control (such as the unlocking of the doors) corresponding to the operation of the operation input device 4 is performed in the vehicle 1.

Furthermore, according to the keyless entry system illustrated in FIG. 1, after the transmission of the LF request signal Rq from the vehicle-side device 2 of the vehicle 1 to the portable device 3, radio signals for determining the position of the portable device 3 (which may be hereinafter referred to as "position determination signals S") are sequentially transmitted from multiple antennas ANT1, ANT2, ANT3, ANT4 and ANT5 (for example, FIG. 3) provided on the vehicle 1. The portable device 3 calculates the distance between the portable device 3 and each of the antennas ANT1 through ANT5 based on the received signal strengths of the position determination signals S transmitted from the antennas ANT1 through ANT5. The vehicle-side device 2 determines whether the portable device 3 is positioned inside the vehicle 1 based on the distances included in the response signal An. When it is determined that the portable device 3 is positioned inside the vehicle 1, the doors are prevented from being locked to prevent a key from being locked inside the vehicle 1.

Referring to FIG. 1, the portable device 3 includes a transmission part 31, an antenna ANT7 connected to the transmission part 31, a reception part 32, an antenna ANT8 connected to the reception part 32, a processing part 33, and a storage part 34.

The transmission part 31 transmits an RF radio signal to the vehicle-side device 2. That is, the transmission part 31 performs predetermined signal processing including encoding, modulation, and amplification on transmission data (data to be transmitted) generated in the processing part 33 to generate a signal of the RF band, and transmits the generated signal from the antenna ANT7 as a radio signal.

The reception part 32 receives an LF radio signal transmitted from the vehicle-side device 2. That is, the reception part 32 performs predetermined signal processing including amplification, demodulation, and decoding on a signal of the LF band received at the antenna ANT8 to generate received data, and outputs the generated received data to the processing part 33.

The processing part 33 is a circuit that performs overall processing of the portable device 3, and includes, for example, a computer (such as a microprocessor) that executes commands based on a program 341 stored in the storage part 34, and a dedicated logic circuit (such as an application-specific integrated circuit [ASIC]).

When the reception part 32 receives the above-described request signal Rq, the processing part 33 generates authentication information used in the authentication process in the vehicle-side device 2, based on the identification information of the vehicle 1 included in the request signal Rq and information on the portable device 3 (such as identification information or a rolling code) stored in the storage part 34.

Furthermore, when the reception part 32 receives the position determination signals S transmitted in order from the antennas ANT1 through ANT5 of the vehicle 1 subsequently to the request signal Rq, the processing part 33 obtains the received signal strength of each position determination signal S.

Figure 2:
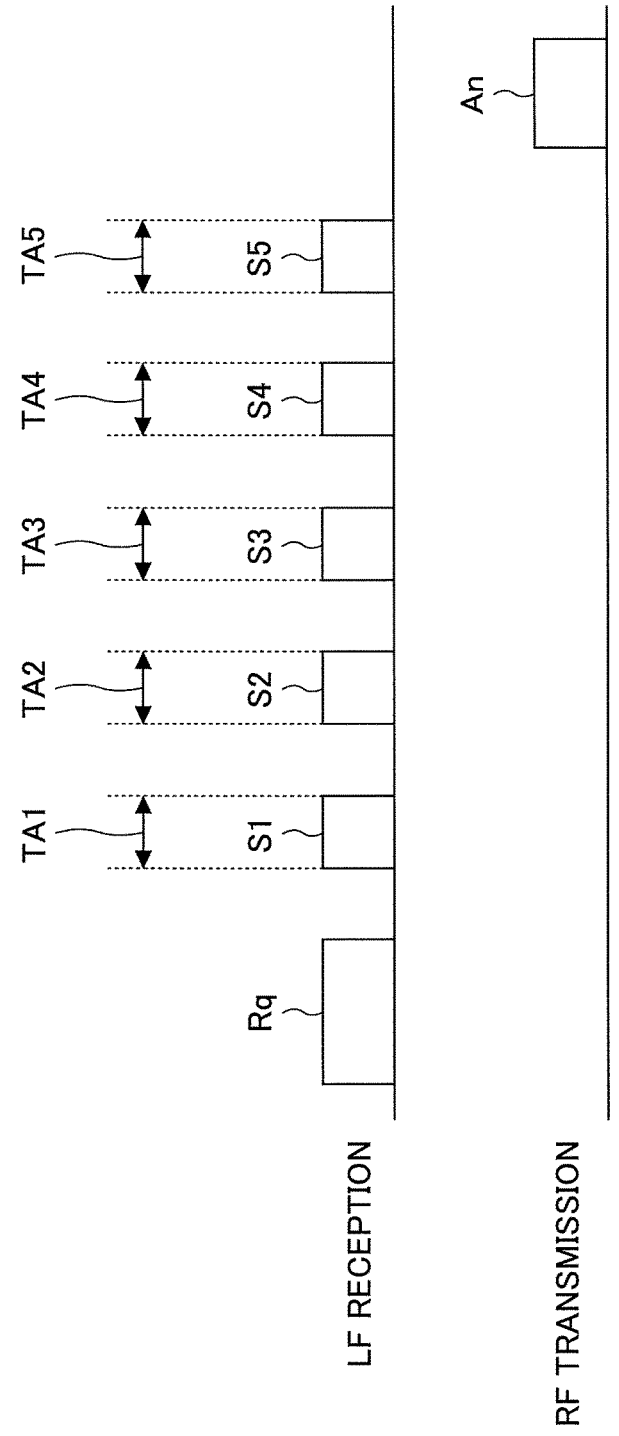
FIG. 2 is a diagram illustrating LF signals received at the portable device and an RF signal transmitted from the portable device.

FIG. 2 is a diagram illustrating LF signals received at the portable device 3 and an RF signal transmitted from the portable device 3. In FIG. 2, the LF signals are depicted at the top, and the RF signal is depicted at the bottom. In FIGS. 2, S1, S2, S3, S4, and S5 indicate position determination signals transmitted from different antennas, and TA1, TA2, TA3, TA4, and TA5 indicate the respective transmission periods of the position determination signals S1 through S5.

The timing of transmission of the request signal Rq and the position determination signals S1 through S5 by the vehicle-side device 2 is predetermined. Therefore, when the request signal Rq is received at the reception part 32, the transmission periods TA1 through TA5 of the position determination signals S1 through S5 are determined from the time of the reception. The processing part 33 obtains the received signal strengths of the position determination signals S1 through S5 at the reception part 32 during their respective transmission periods TA1 through TA5 determined in accordance with the time of reception of the request signal Rq.

After the reception of the request signal Rq and the position determination signals S1 through S5, the processing part 33 generates the response signal An including the above-described authentication information and the below-described distances (evaluation values), and transmits the generated response signal An from the transmission part 31 to the vehicle-side device 2.

Referring to FIG. 1, the processing part 33 includes an evaluation value calculating part 331. The evaluation value calculating part 331 calculates evaluation values related to the position of the portable device 3 based on the received signal strengths of the position determination signals S1 through S5 received from the antennas ANT1 through ANT5. According to this embodiment, an evaluation value calculated by the evaluation value calculating part 331 is the distance between one of the antennas ANT1 through ANT5 of the vehicle 1 and the portable device 3.

For example, a data table correlating the received signal strength of the position determination signal S with distance is prestored in the storage part 34. The evaluation value calculating part 331 obtains a distance (evaluation value) corresponding to the received signal strength of the position determination signal S based on this data table. Alternatively, the evaluation value calculating part 331 may calculate a distance (evaluation value) corresponding to the received signal strength through numerical operations using an approximate function.

To keep the relationship between received signal strength and distance constant without dependence on the orientation or position of the portable device 3, an omnidirectional antenna such as a three-axis antenna is used for the antenna ANT8.

The storage part 34 is a device that stores, for example, the program 341 for a computer in the processing part 33, data prepared for processing, and data temporarily stored during processing, and includes a random access memory (RAM), a non-volatile memory, and a hard disk drive. The program 341 and data stored in the storage part 34 may be downloaded from a host apparatus via an interface unit (not depicted) or read from a non-transitory recording medium such as an optical disk or a universal serial bus (USB) memory.

Figure 3:
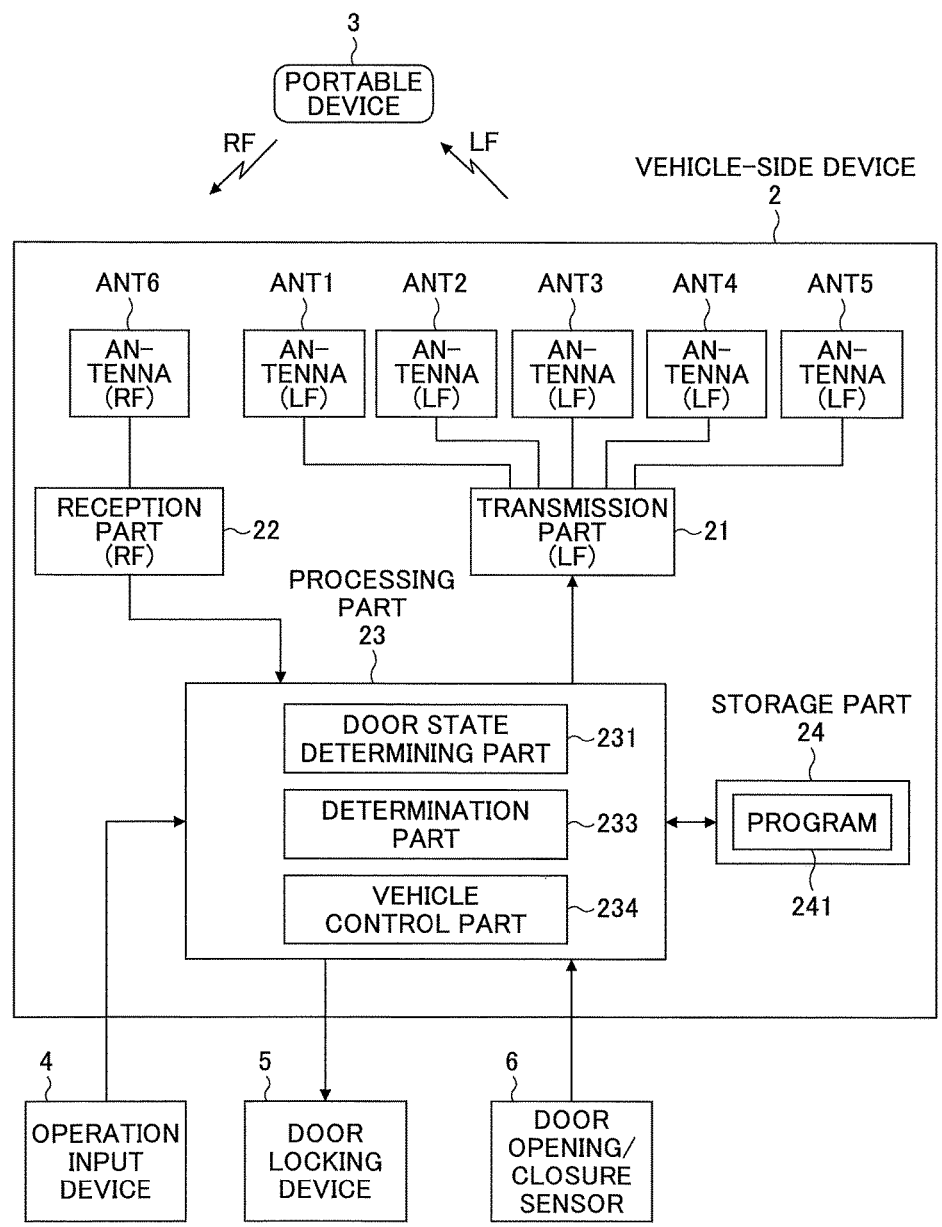
FIG. 3 is a diagram illustrating a configuration of the keyless entry system according to the first embodiment, mainly showing a configuration of a vehicle-side device.

FIG. 3 is a diagram illustrating a configuration of the vehicle-side device 2. Referring to FIG. 3, the vehicle-side device 2 includes a transmission part 21, the antennas ANT1 through ANT5 connected to the transmission part 21, a reception part 22, an antenna ANT6 connected to the reception part 22, a processing part 23, and a storage part 24.

The transmission part 21 transmits an LF radio signal to the portable device 3. That is, the transmission part 21 performs predetermined signal processing including encoding, modulation, and amplification on transmission data (data to be transmitted) generated in the processing part 23 to generate a signal of the LF band, and transmits the generated signal from one of the antennas ANT1 through ANT5 as a radio signal. In this case, the transmission part 21 selects one of the antennas ANT1 through ANT5 in accordance with the control of the processing part 23, and transmits a radio signal from the selected one of the antennas ANT1 through ANT 5.

Figure 4:
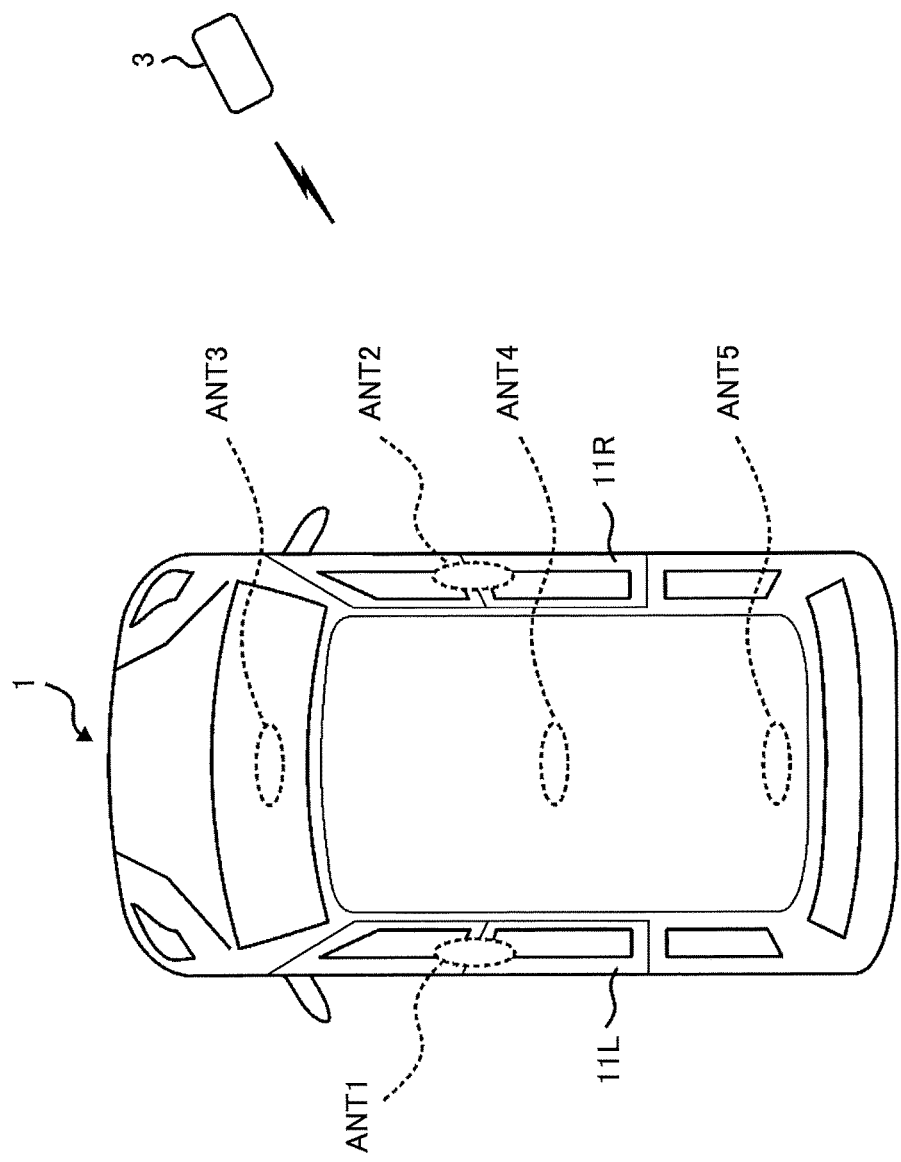
FIG. 4 is a diagram illustrating an arrangement of antennas in a vehicle.

FIG. 4 is a diagram illustrating installation locations of the antennas ANT1 through ANT 5 in the vehicle 1. Referring to FIG. 4, the antenna ANT1 is installed near a left door 11L of the vehicle 1, the antenna ANT2 is installed near a right door 11R of the vehicle 1, the antenna ANT3 is installed in the front of the vehicle interior, the antenna ANT4 is installed in the center of the vehicle interior, and the antenna ANT5 is installed in the rear of the vehicle interior. In the following description, the antennas ANT1 through ANT5 may be collectively referred to as "antenna ANT" without being distinguished from one another.

The reception part 22 receives an RF radio signal transmitted from the portable device 3. That is, the reception part 22 performs predetermined signal processing including amplification, demodulation, and decoding on a signal of the RF band received at the antenna ANT6 to generate received data, and outputs the generated received data to the processing part 23.

The processing part 23 is a circuit that performs overall processing of the vehicle-side device 2, and includes, for example, a computer (such as a microprocessor) that executes commands based on a program 241 stored in the storage part 24, and a dedicated logic circuit (such as an application-specific integrated circuit [ASIC]).

In response to the inputting of a user's operation that gives an instruction to unlock or lock the doors to the operation input device 4 provided in the vehicle 1, the processing part 23 performs radio communications with the portable device 3 using the transmission part 21 and the reception part 22.

In the radio communications, first, the processing part 23 executes a transmission process to transmit the LF request signal Rq that requests a response from the portable device 3 from the transmission part 21. In this case, the processing part 23 uses a single antenna selected from the antennas ANT1 through ANT5 to transmit the request signal Rq.

Furthermore, subsequently to the transmission of the request signal Rq, the processing part 23 also executes a process to transmit the position determination signals S of a constant frequency and amplitude from the transmission part 21. The processing part 23 selects the antennas ANT1 through ANT5 in predetermined order, and transmits the position determination signal S from each selected antenna ANT. The position determination signals S are used to calculate the distances from the antennas ANT1 through ANT5 (evaluation values) in the portable device 3.

After the transmission of the request signal Rq and the position determination signals S, the processing part 23 waits for the response signal An respondent to the request signal Rq from the portable device 3. The response signal An includes authentication information that verifies that the transmission source is a valid portable device 3 and the distances from the antennas ANT1 through ANT5 (evaluation values) calculated in the portable device 3. In response to the reception of the response signal An from the portable device 3 at the reception part 22, the processing part 23 executes an authentication process to determine whether the transmission source is a valid portable device 3 based on the authentication information included in the received response signal An. Furthermore, the processing part 23 executes a process to determine the position of the portable device 3 relative to the vehicle 1 based on the distances (evaluation values) included in the received response signal An.

Referring to FIG. 3, the processing part 23 includes a door state determining part 231, a determination part 233, and a vehicle control part 234.

The door state determining part 231 determines the open or closed state of the doors 11L and 11R for getting in and out of the vehicle 1. For example, as illustrated in FIG. 3, the door state determining part 231 determines whether the doors 11L and 11R are locked or unlocked based on signals from a door opening/closure sensor 6 configured to detect the open or closed state of the doors 11L and 11R. According to this embodiment, the doors 11L and 11R are slidable doors.

The determination part 233 determines the position of the portable device 3 relative to the vehicle 1 based on the distances from the antennas ANT1 through ANT5 (evaluation values) included in the response signal An from the portable device 3. Specifically, the determination part 233 determines that the portable device 3 is positioned inside the vehicle 1 when the distances from the antennas ANT3 through ANT5 inside the vehicle 1 (evaluation values) satisfy a predetermined condition. Furthermore, the determination part 233 determines that the portable device 3 is positioned in a predetermined neighborhood range of the vehicle 1 when the distances from the antennas ANT1 and ANT2 outside the vehicle 1 (evaluation values) satisfy a predetermined condition.

The determination part 233, however, changes the condition for determining that the portable device 3 is positioned inside the vehicle 1 in accordance with the result of a determination as to the door open/closed state in the door state determining part 231. That is, when the door state determining part 231 determines that the doors 11L and 11R are both closed, the determination part 233 determines that the portable device 3 is positioned inside the vehicle 1 if the distances from the antennas ANT3 through ANT5 inside the vehicle 1 (evaluation values) satisfy a predetermined first condition. When the door state determining part 231 determines that at least one of the doors 11L and 11R is open, the determination part 233 determines that the portable device 3 is positioned inside the vehicle 1 if the distances from the antennas ANT3 through ANT5 inside the vehicle 1 (evaluation values) satisfy a predetermined second condition different from the first condition.

Figure 5:
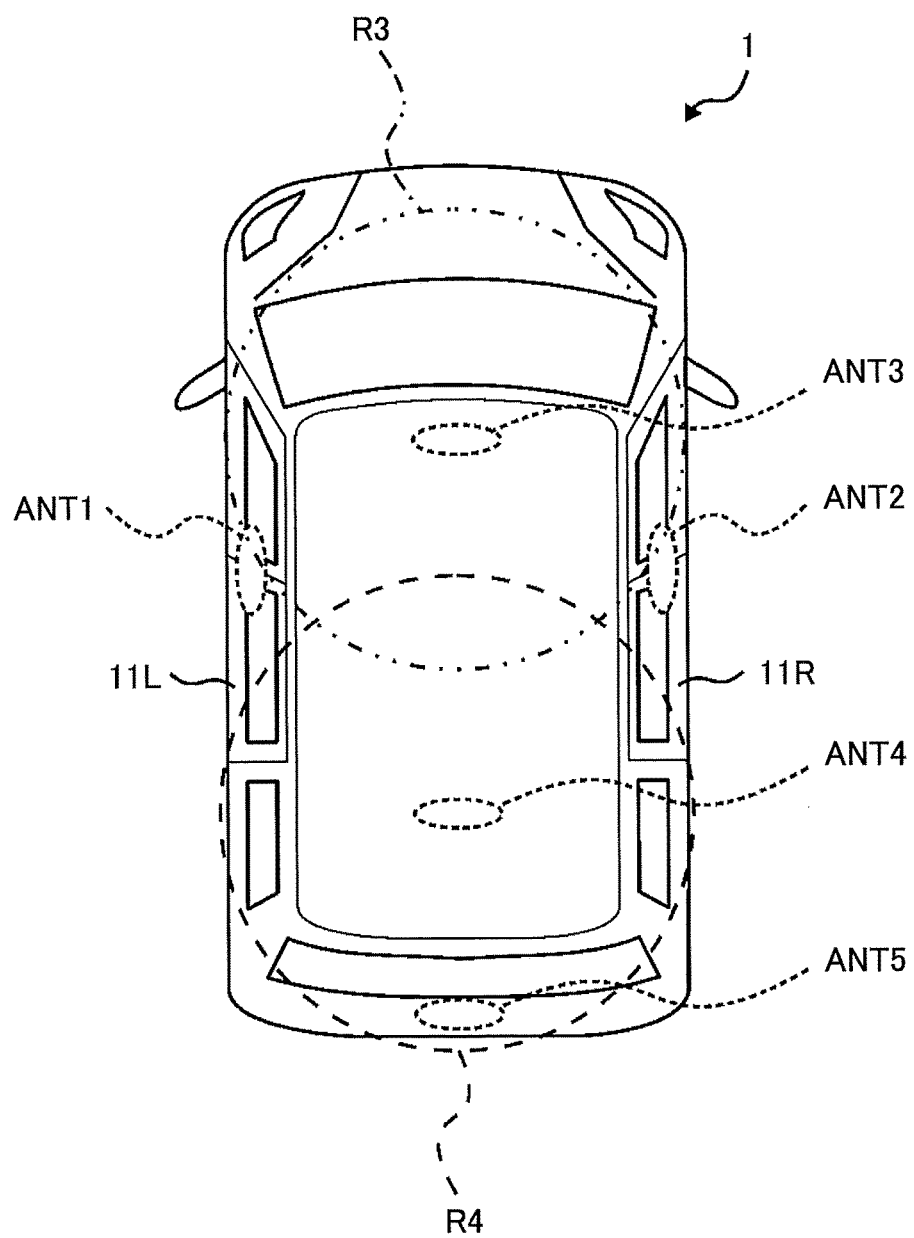
FIG. 5 is a diagram for illustrating conditions for determining the position of the portable device.
Figure 6:
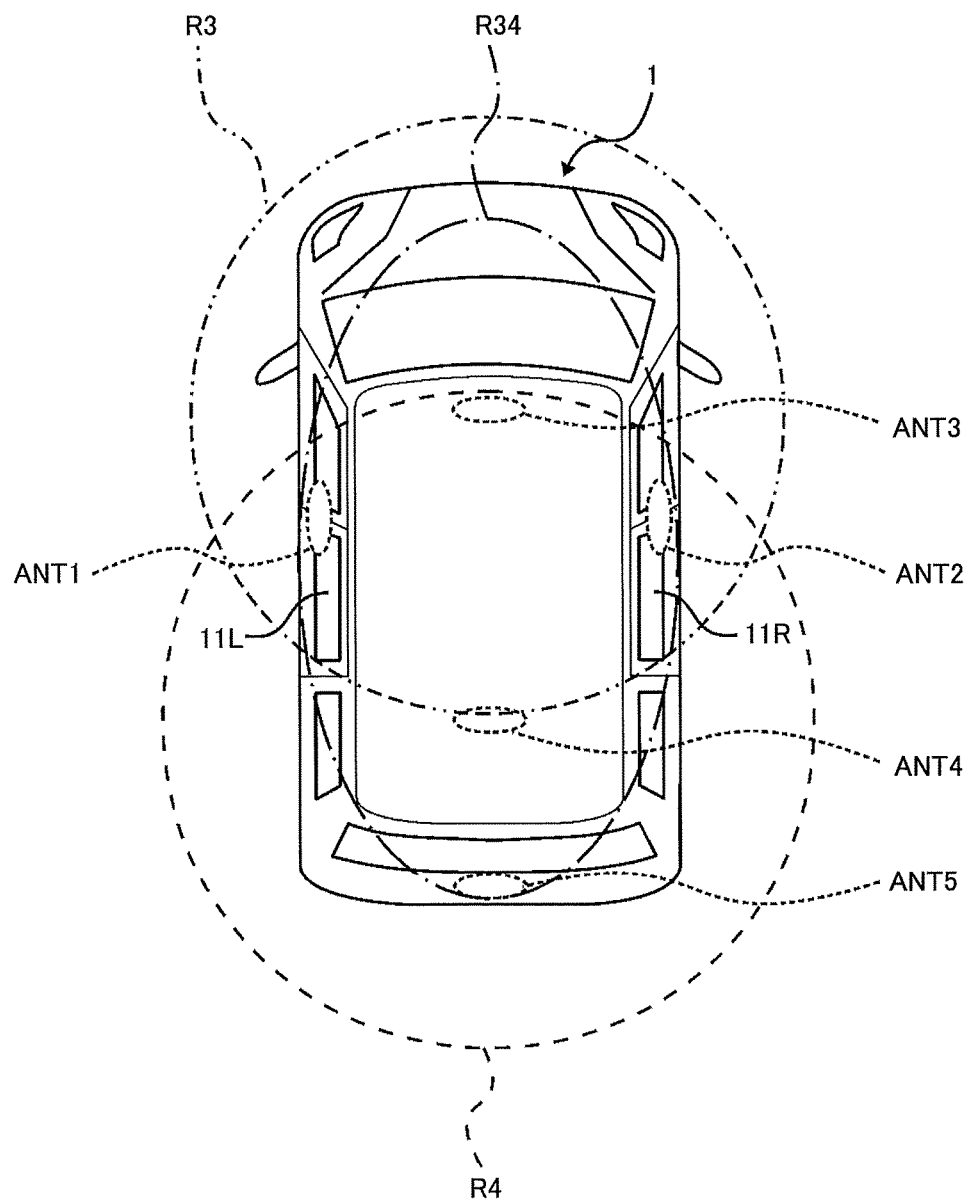
FIG. 6 is another diagram for illustrating conditions for determining the position of the portable device.
Figure 7:
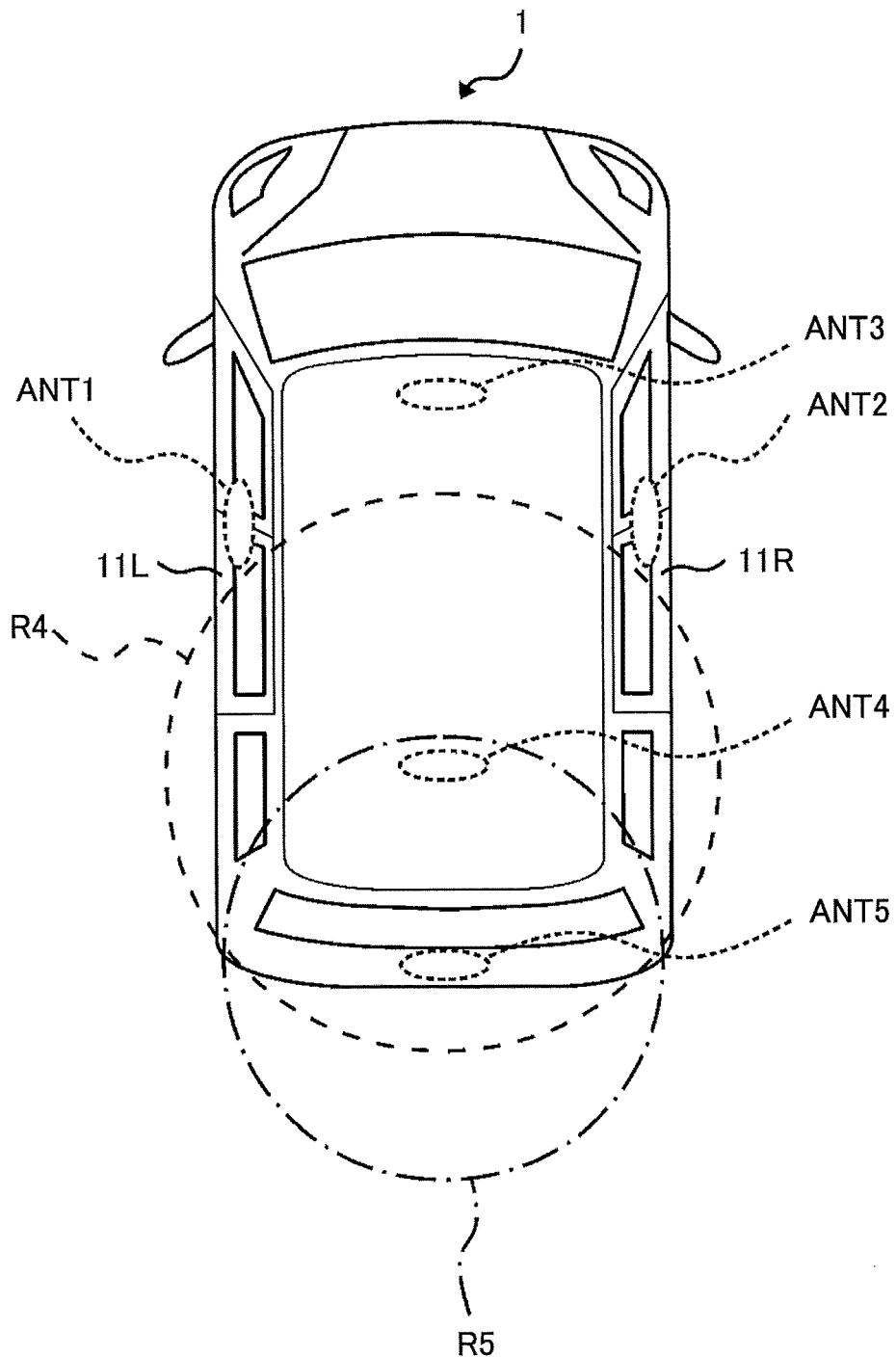
FIG. 7 is yet another diagram for illustrating conditions for determining the position of the portable device.

FIGS. 5, 6 and 7 are diagrams for illustrating conditions for determining the position of the portable device 3 in the determination part 233. In FIGS. 5 through 7, "R3" indicates a range where a distance L3 from the antenna ANT3 is less than or equal to a certain value, "R4" indicates a range where a distance L4 from the antenna ANT4 is less than or equal to a certain value, and "R5" indicates a range where a distance L5 from the antenna ANT5 is less than or equal to a certain value. The ranges R3 through R5 are spherical ranges. In FIG. 6, "R34" indicates a range where the sum of the distance L3 from the antenna ANT3 and the distance L4 from the antenna ANT4 (L3+L4) is less than or equal to a certain value. The range R34 is a spheroidal range.

The condition for determining that the portable device 3 is inside the vehicle 1 (the first condition or the second condition) is composed of, for example, four sub-conditions (1), (2), (3) and (4). The determination part 233 determines that the portable device 3 is inside the vehicle 1 when at least one of the sub-conditions (1) through (4) is satisfied.

The range R3 in FIG. 5 illustrates an example range where the sub-condition (1) is satisfied. The sub-condition (1) is that the distance L3 from the antenna ANT3 is less than or equal to a threshold THa, and is expressed by:

$$L3 \leq THa.$$

The range R4 in FIG. 5 illustrates an example range where the sub-condition (2) is satisfied. The sub-condition (2) is that the distance L4 from the antenna ANT4 is less than or equal to a threshold THb, and is expressed by:

$$L4 \leq THb.$$

The overlap of the ranges R3, R4 and R34 in FIG. 6 illustrates an example range where the sub-condition (3) is satisfied. The sub-condition (3) is that the distance L3 is less than or equal to a threshold THc, that the distance L4 is less than or equal to a threshold THd, and that the sum of the distance L3 and the distance L4 is less than or equal to a threshold THe, where all of the following three relations are satisfied:

$$L3 \leq THc,$$

$$L4 \leq THd, \text{ and}$$

$$(L3+L4) \leq THe.$$

The overlap of the ranges R4 and R5 in FIG. 7 illustrates an example range where the sub-condition (4) is satisfied. The sub-condition (4) is that the distance L4 is less than or equal to a threshold THf and that the distance L5 is less than or equal to a threshold THg, where both of the following two relations are satisfied:

$$L4 \leq THf, \text{ and}$$

$$L5 \leq THg.$$

The determination part 233 changes at least one of the thresholds THa through THg of the above-described sub-conditions (1) through (4) in accordance with the result of a determination as to the open or closed state of the doors 11L and 11R in the door state determining part 231. That is, the determination part 233 causes thresholds to be smaller in the case where it is determined that at least one of the doors 11L and 11R is open than in the case where it is determined that the doors 11L and 11R are both closed. In the case of FIGS. 5 through 7, the opening and closing parts of the doors 11L and 11R are relatively close to the ranges R4 and R34. Therefore, for example, the determination part 233 causes the thresholds THb, THe, and THE to be smaller when it is determined that at least one of the doors 11L and 11R is open.

Referring back to FIG. 3, when it is determined that the transmission source of the response signal An is a valid portable device 3, the vehicle control part 234 performs vehicle control corresponding to the operation of the operation input device 4 if the position of the portable device 3 satisfies a predetermined condition. For example, when an operation to unlock the doors is performed on the operation input device 4, the vehicle control part 234 outputs a control signal that gives an instruction to unlock the doors (an unlocking control signal) to a door locking device 5 of the vehicle 1 in response to a determination that the portable device 3 is in a predetermined neighborhood range of the vehicle 1. Furthermore, when an operation to lock the doors is performed on the operation input device 4, the vehicle control part 234 outputs a control signal to give an instruction to lock the doors (a lock control signal) to the door locking device 5 in response to a determination that the portable device 3 is outside the vehicle 1.

Furthermore, when the operation input device 4 (such as a door open/close button) of the slidable door 11L or 11R is operated during the closure of the door 11L or 11R, the vehicle control part 234 outputs the lock control signal when the door 11L or 11R becomes closed. The vehicle control part 234, however, does not output the lock control signal even when the door 11L or 11R becomes closed, if the determination part 233 determines that the portable device 3 is positioned inside the vehicle 1.

The storage part 24 is a device that stores, for example, the program 241 for a computer in the processing part 23, data prepared for processing, and data temporarily stored during processing, and includes a RAM, a non-volatile memory, and a hard disk drive. The program 241 and data stored in the storage part 24 may be downloaded from a host apparatus via an interface unit (not depicted) or read from a non-transitory recording medium such as an optical disk or a USB memory.

Here, an operation of the keyless entry system according to this embodiment having the above-described configuration is described with reference to the flowcharts of FIGS. 8 and 9.

Figure 8:
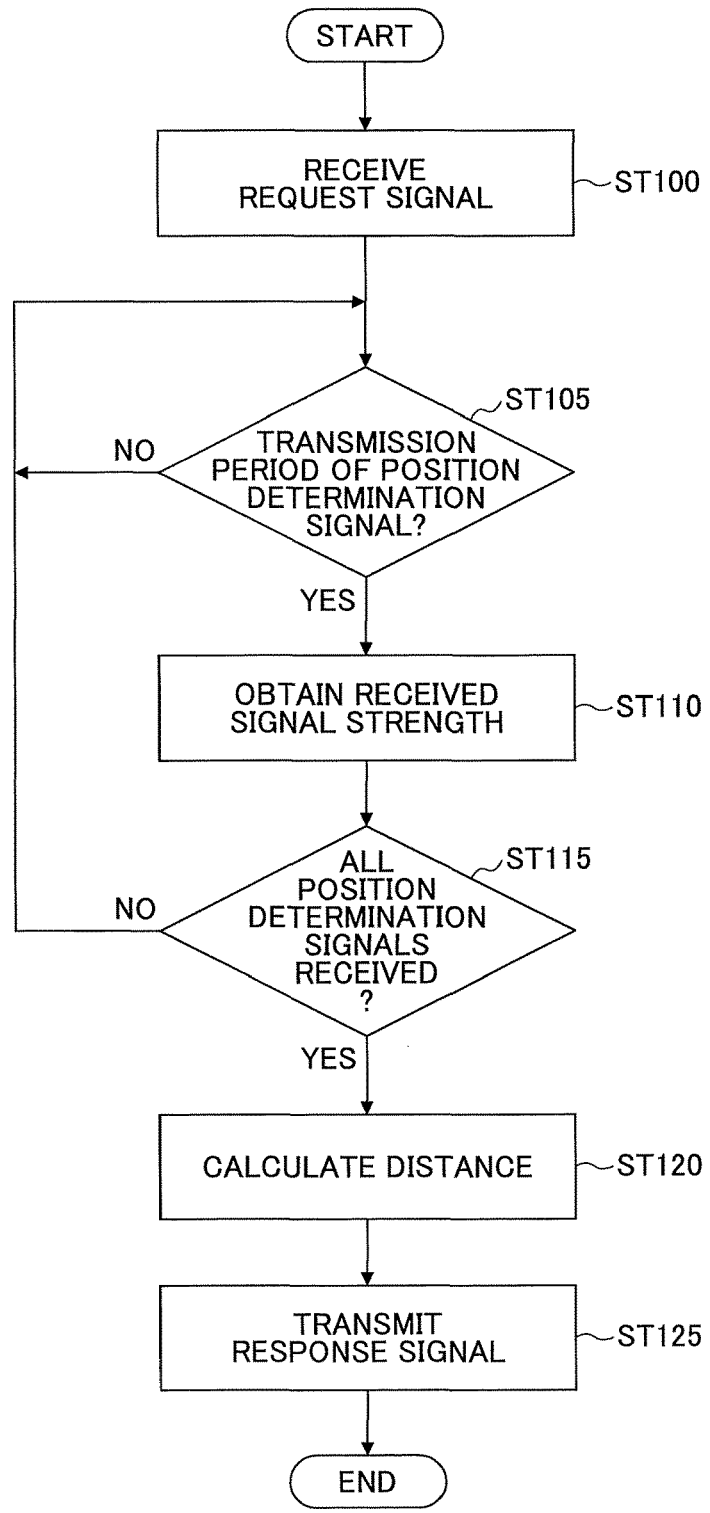
FIG. 8 is a flowchart for illustrating a process in the portable device in the keyless entry system according to the first embodiment.

FIG. 8 is a flowchart for illustrating a process in the portable device 3, mainly showing a process related to a determination as to the position of the portable device 3.

When the reception part 32 receives the request signal Rq from the vehicle-side device 2 at step ST100, at step ST105, the processing part 33 determines, with reference to the time of reception of the request signal Rq, whether the transmission period of a position determination signal S has arrived. If the transmission period of a position determination signal S has arrived (YES at step ST105), at step ST110, the processing part 33 obtains a received signal strength at the reception part 32, and stores the obtained received signal strength in the storage part 34. After obtaining the received signal strength with respect to one position determination signal S, at step ST115, the processing part 33 determines whether the position determination signal S is to be further transmitted from another antenna. If the position determination signal S is to be transmitted from another antenna (NO at step ST115), the processing part 33 returns to step ST105 to repeat the above-described process.

When the received signal strength of the position determination signal S is obtained with respect to each of the antennas ANT1 through ANT5 (YES at step ST115), at step ST120, the evaluation value calculating part 331 calculates the distances from the antennas ANT1 through ANT5 (evaluation values) based on the received signal strengths of the position determination signals S transmitted from the antennas ANT1 through ANT5. For example, the evaluation value calculating part 331 obtains a distance corresponding to the received signal strength, referring to the data table of the storage part 34 where the received signal strength is correlated with distance.

At step ST125, the processing part 33 transmits the response signal An, including information on the distance from each antenna ANT calculated in the evaluation value calculating part 331 and authentication information to be used for authentication in the vehicle-side device 2, from the transmission part 31 to the vehicle-side device 2.

Figure 9:
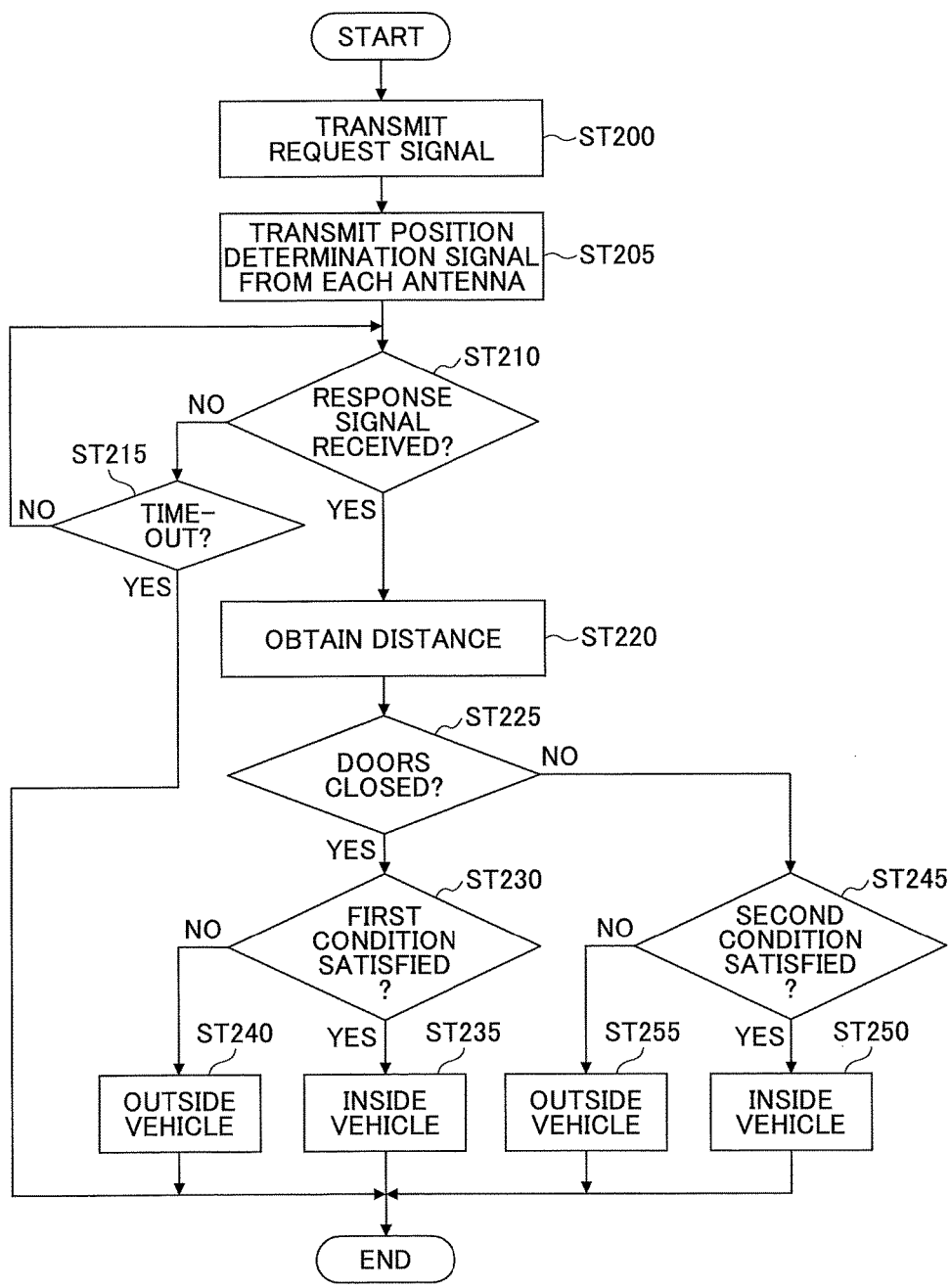
FIG. 9 is a flowchart for illustrating a process in the vehicle-side device in the keyless entry system according to the first embodiment.

FIG. 9 is a flowchart for illustrating a process in the vehicle-side device 2, mainly showing a process related to a determination as to the position of the portable device 3.

For example, when a user operates the operation input device 4, at step ST200, the processing part 23 transmits the request signal Rq to the portable device 3. After the transmission of the request signal Rq, at step ST205, the processing part 23 selects the antennas ANT1 through ANT 5 in order, and transmits the position determination signal S from each selected antenna ANT.

After the transmission of the position determination signal S from each of the antennas ANT1 through ANT5, at step ST210, the processing part 23 monitors whether the response signal An of the portable device 3 is received at the reception part 22. If the response signal An is not received (NO at step ST210), and the monitoring time exceeds a predetermined period for a time-out (YES at step ST215), the processing part 23 ends the process.

If the response signal An is received at the reception part 22 (YES at step ST210), at step ST220, the processing part 23 obtains the distance from each antenna ANT (evaluation value) included in the response signal An.

At step ST225, the door state determining part 231 determines the open or closed state of the doors 11L and 11R. If the door state determining part 231 determines that the doors 11L and 11R are both closed (YES at step ST225), at step ST230, the determination part 233 determines whether the distances from the antennas ANT3 through ANT5 inside the vehicle 1 (evaluation values) satisfy the predetermined first condition. If the distances from the antennas ANT3 through ANT5 inside the vehicle 1 (evaluation values) satisfy the first condition (YES at step ST230), at step ST235, the determination part 233 determines that the portable device 3 is positioned inside the vehicle 1. If the distances from the antennas ANT3 through ANT5 inside the vehicle 1 (evaluation values) do not satisfy the first condition (NO at step ST230), at step ST240, the determination part 233 determines that the portable device 3 is positioned outside the vehicle 1.

If the door state determining part 231 determines that at least one of the doors 11L and 11R is open (NO at step ST225), at step ST245, the determination part 233 determines whether the distances from the antennas ANT3 through ANT5 inside the vehicle 1 (evaluation values) satisfy the predetermined second condition. At least one of the thresholds THa through THg of the sub-conditions (1) through (4) is set to a smaller value in the second condition than in the first condition. If the distances from the antennas ANT3 through ANT5 inside the vehicle 1 (evaluation values) satisfy the second condition (YES at step ST245), at step ST250, the determination part 233 determines that the portable device 3 is positioned inside the vehicle 1. If the distances from the antennas ANT3 through ANT5 inside the vehicle 1 (evaluation values) do not satisfy the second condition (NO at step ST245), at step ST255, the determination part 233 determines that the portable device 3 is positioned outside the vehicle 1.

As described above, according to this embodiment, the predetermined condition to be satisfied by the distances from the antennas ANT3 through ANT5 inside the vehicle 1 (evaluation values) in order for the portable device 3 to be determined as being positioned inside the vehicle 1 is changed according to the open or closed state of the doors 11L and 11R. As a result, even when the received signal strength of a position determination signal S at the portable device 3 differs between the case where the doors 11L and 11R are closed and the case where at least one of the doors 11L and 11R is open, the condition for position determination based on the distances (evaluation values) can be properly set in accordance with the difference in received signal strength. Accordingly, even when there is a change in the open or closed state of the doors 11L and 11R, the position of the portable device 3 relative to the vehicle 1 can be correctly determined.

According to this embodiment, the condition to be satisfied by the distances from the antennas ANT3 through ANT5 inside the vehicle 1 (evaluation values) in order for the portable device 3 to be determined as being positioned inside the vehicle 1 includes the condition that the distance from one antenna is less than or equal to a threshold and the condition that the sum of the distances from two antennas is less than or equal to a threshold. When at least one of the doors 11L and 11R is open, at least one of the thresholds is set to a smaller value than in the case where the doors 11L and 11R are both closed. As a result, the condition of distances (evaluation values) for determining that the portable device 3 is inside the vehicle 1 becomes stricter. Therefore, even when at least one of the doors 11L and 11R is open to relatively increase the received signal strength, the portable device 3 can be less likely to be wrongly determined as being positioned inside the vehicle 1.

Second Embodiment

Next, a second embodiment according to the present invention is described.

According to the above-described embodiment, the distance between an antenna of a vehicle and a portable device is calculated as an evaluation value with respect to the position of the portable device. According to this embodiment, the Mahalanobis distance between a data group of received signal strength at multiple points inside a vehicle and the received signal strength obtained at a portable device and the Mahalanobis distance between a data group of received signal strength at multiple points outside the vehicle and the received signal strength obtained at the portable device are calculated as evaluation values.

Figure 10:
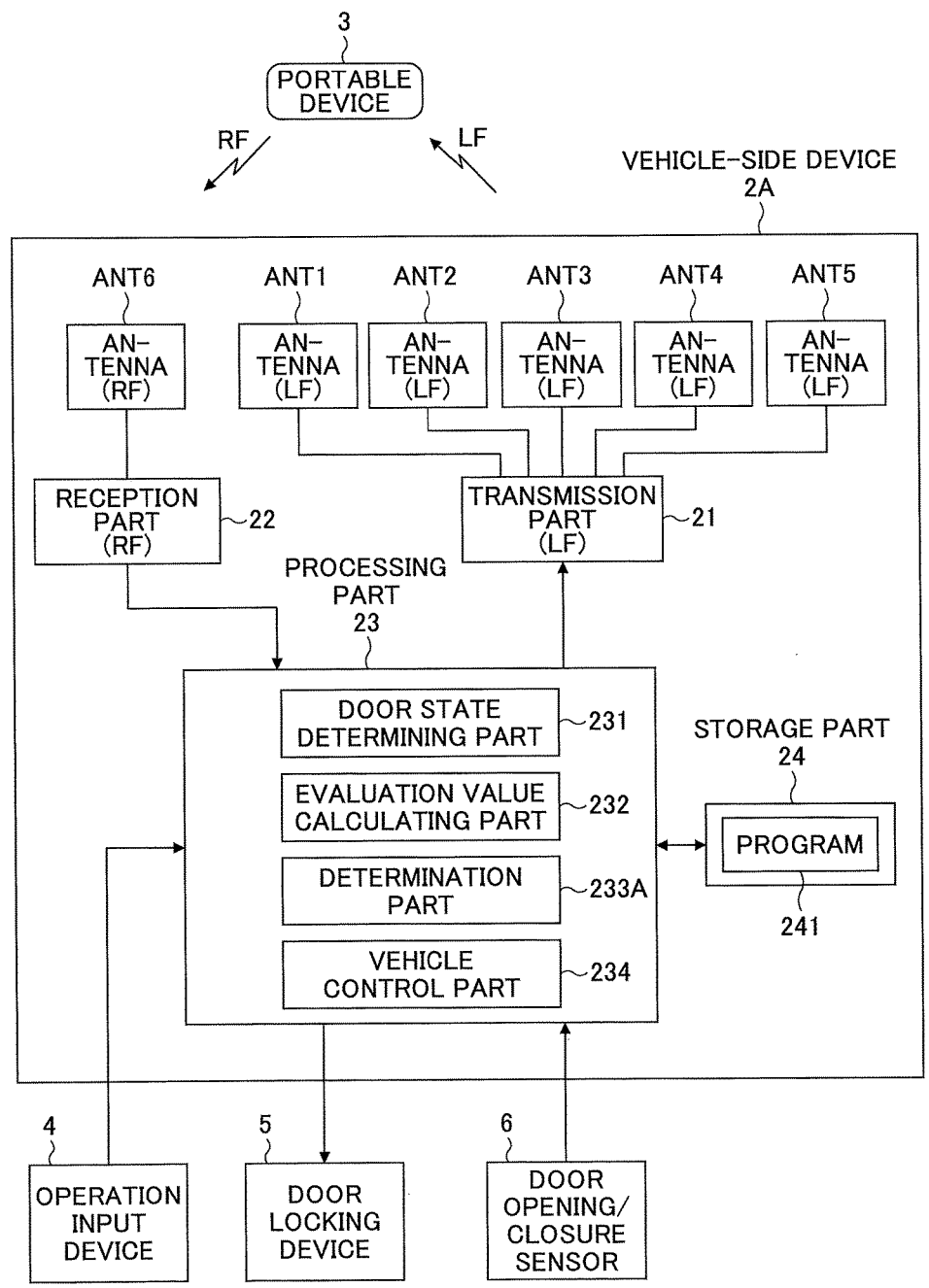
FIG. 10 is a diagram illustrating a configuration of a keyless entry system according to a second embodiment, mainly showing a configuration of the vehicle-side device.

FIG. 10 is a diagram illustrating a configuration of a keyless entry system according to the second embodiment, mainly showing a configuration of a vehicle-side device 2A. The vehicle-side device 2A according to this embodiment generally has the same configuration as the above-described vehicle-side device 2 (FIG. 3) except that an evaluation value calculating part 232 is added to the processing part 23 of the vehicle-side device 2 and that the determination part 233 of the vehicle-side device 2 is changed to a determination part 233A. In the following description, differences from the keyless entry system of the first embodiment are mainly described.

The portable device 3 in the keyless entry system according to this embodiment generally has the same configuration as the portable device 3 as illustrated in FIG. 1 except that the processing part 33 does not include the evaluation value calculating part 331. Instead, the processing part 33 according to this embodiment includes information on the received signal strengths of the position determination signals S from the antennas ANT1 through ANT5 in the response signal An transmitted from the transmission part 31.

The evaluation value calculating part 232 calculates, as evaluations values related to the position of the portable device 3, the Mahalanobis distances between the received signal strengths of the position determination signals S from the antennas ANT1 through ANT5 included in the response signal An received at the reception part 32 and data groups of received signal strengths obtained in advance by actual measurements or a simulation.

The evaluation value calculating part 232 changes the method of calculating a Mahalanobis distance (evaluation value) in accordance with the result of a determination as to the open or closed state of the doors 11L and 11R in the door state determining part 231. That is, when the door state determining part 231 determines that the doors 11L and 11R are both closed, the evaluation value calculating part 232 calculates a first Mahalanobis distance M1 and a second Mahalanobis distance M2 as evaluation values, and when the door state determining part 231 determines that at least one of the doors 11L and 11R is open, the evaluation value calculating part 232 calculates a third Mahalanobis distance M3 and a fourth Mahalanobis distance M4 as evaluation values.

The first Mahalanobis distance M1 is the Mahalanobis distance between a first data group and the received signal strengths of the position determination signals S from the antennas ANT1 through ANT5 included in the response signal An, where the first data group indicates the received signal strengths of the position determination signals S from the antennas ANT1 through ANT5 received at multiple points inside the vehicle 1 with the doors 11L and 11R both closed.

The second Mahalanobis distance M2 is the Mahalanobis distance between a second data group and the received signal strengths of the position determination signals S from the antennas ANT1 through ANT5 included in the response signal An, where the second data group indicates the received signal strengths of the position determination signals S from the antennas ANT1 through ANT5 received at multiple points outside the vehicle 1 with the doors 11L and 11R both closed.

The third Mahalanobis distance M3 is the Mahalanobis distance between a third data group and the received signal strengths of the position determination signals S from the antennas ANT1 through ANT5 included in the response signal An, where the third data group indicates the received signal strengths of the position determination signals S from the antennas ANT1 through ANT5 received at multiple points inside the vehicle 1 with at least one of the doors 11L and 11R open.

The fourth Mahalanobis distance M4 is the Mahalanobis distance between a fourth data group and the received signal strengths of the position determination signals S from the antennas ANT1 through ANT5 included in the response signal An, where the fourth data group indicates the received signal strengths of the position determination signals S from the antennas ANT1 through ANT5 received at multiple points outside the vehicle 1 with at least one of the doors 11L and 11R open.

The first Mahalanobis distance M1 and the third Mahalanobis distance M3 indicate the correlation with data groups of received signal strengths inside the vehicle 1 (namely, the first data group and the third data group), and the shorter the distance, the more probable it is that the received signal strengths of the position determination signals S included in the response signal An have been obtained inside the vehicle 1. The second Mahalanobis distance M2 and the fourth Mahalanobis distance M4 indicate the correlation with data groups of received signal strengths outside the vehicle 1 (namely, the second data group and the fourth data group), and the shorter the distance, the more probable it is that the received signal strengths of the position determination signals S included in the response signal An have been obtained outside the vehicle 1.

Parameters for calculating the first through fourth Mahalanobis distances M1 through M4 are stored in the storage part 24. The evaluation value calculating part 232 calculates Mahalanobis distances using these parameters.

When the door state determining part 231 determines that the doors 11L and 11R are both closed, the determination part 233A determines that the portable device 3 is positioned inside the vehicle 1 if the first Mahalanobis distance M1 is shorter than the second Mahalanobis distance M2 (M1<M2). When the door state determining part 231 determines that at least one of the doors 11L and 11R is open, the determination part 233A determines that the portable device 3 is positioned inside the vehicle 1 if the third Mahalanobis distance M3 is shorter than the fourth Mahalanobis distance M4 (M3<M4). Otherwise, the determination part 233A operates in the same manner as the above-described determination part 233.

Figure 11:
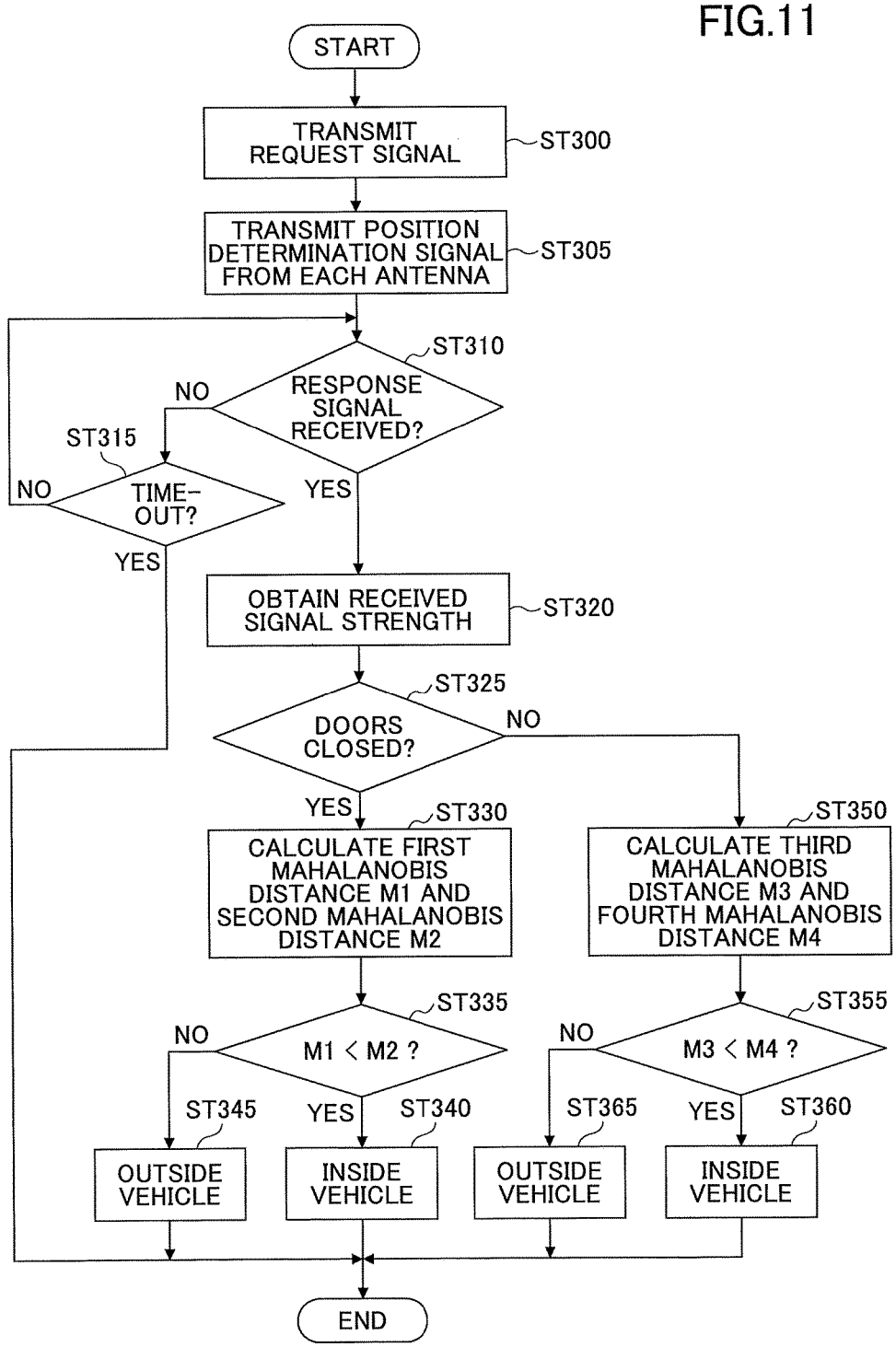
FIG. 11 is a flowchart for illustrating a process in the vehicle-side device in the keyless entry system according to the second embodiment.

FIG. 11 is a flowchart for illustrating a process in the vehicle-side device 2A, mainly showing a process related to a determination as to the position of the portable device 3. A description of the process of steps ST300 through ST315, which is the same as the process of steps ST200 through ST215 in FIG. 9, is omitted.

If the response signal An is received at the reception part 22 (YES at step ST310), at step ST320, the processing part 23 obtains the received signal strengths of the position determination signals S from the antennas ANT1 through ANT5 included in the response signal An.

At step ST325, the door state determining part 231 determines the open or closed state of the doors 11L and 11R. If the door state determining part 231 determines that the doors 11L and 11R are both closed (YES at step ST325), at step ST330, the evaluation value calculating part 232 calculates the first Mahalanobis distance M1 and the second Mahalanobis distance M2. At step ST335, the determination part 233A compares the first Mahalanobis distance M1 and the second Mahalanobis distance M2. If the first Mahalanobis distance M1 is smaller than the second Mahalanobis distance M2 (YES at step ST335), at step ST340, the determination part 233A determines that the portable device 3 is positioned inside the vehicle 1. If the first Mahalanobis distance M1 is greater than or equal to the second Mahalanobis distance M2 (NO at step ST335), at step ST345, the determination part 233A determines that the portable device 3 is positioned outside the vehicle 1.

If the door state determining part 231 determines that at least one of the doors 11L and 11R is open (NO at step ST325), at step ST350, the evaluation value calculating part 232 calculates the third Mahalanobis distance M3 and the fourth Mahalanobis distance M4. At step ST355, the determination part 233A compares the third Mahalanobis distance M3 and the fourth Mahalanobis distance M4. If the third Mahalanobis distance M3 is smaller than the fourth Mahalanobis distance M4 (YES at step ST355), at step ST360, the determination part 233A determines that the portable device 3 is positioned inside the vehicle 1. If the third Mahalanobis distance M3 is greater than or equal to the fourth Mahalanobis distance M4 (NO at step ST355), at step ST365, the determination part 233A determines that the portable device 3 is positioned outside the vehicle 1.

As described above, according to this embodiment, the Mahalanobis distance between a data group of the received signal strengths of the position determination signals S at multiple points inside the vehicle 1 and the received signal strengths of the position determination signals S received at the portable device 3 and the Mahalanobis distance between a data group of the received signal strengths of the position determination signals S at multiple points outside the vehicle 1 and the received signal strengths of the position determination signals S received at the portable device 3 are calculated using a calculation method according to the open or closed state of the doors 11L and 11R (using different parameters). As a result, even when the received signal strength of a position determination signal S at the portable device 3 differs between the case where the doors 11L and 11R are closed and the case where at least one of the doors 11L and 11R is open, Mahalanobis distances are calculated using a proper calculation method adapted to the difference in received signal strength. Accordingly, the position of the portable device 3 can be correctly determined.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

For example, according to the above-described embodiments, the door state determining part 231 determines the open or closed state of two doors (namely, the doors 11L and 11R), while the number of doors subjected to the determination is not limited to two and may be one or three or more.

Furthermore, according to the above-described embodiments, only one condition (the second condition) for determining that the portable device 3 is positioned inside the vehicle 1 is set with respect to the state where at least one of two doors (the doors 11L and 11R) is open. The present invention, however, is not limited to this configuration. According to other embodiments of the present invention, when the door state determining part 231 determines that at least one of multiple doors is open, the determination condition (second condition) may be set with respect to each of different combinations of the open or closed states of the doors. As a result, even when the received signal strength of a position determination signal S at the portable device 3 differs depending on the combination of the open or closed states of the doors, the determination condition (second condition) can be properly set according to the difference in received signal strength. Accordingly, even when the open or closed states of multiple doors change, the position of the portable device 3 can be correctly determined.

Furthermore, according to the above-described first embodiment, the evaluation value calculating part 331 of the portable device 3 calculates the distance from each antenna ANT (evaluation value), while according to other embodiments of the present invention, at least part of the function of the evaluation value calculating part 331 may be provided in the vehicle-side device 2.

Furthermore, according to the above-described first embodiment, the condition for determining evaluation values in the determination part 233 is changed in accordance with the determination result of the door state determining part 231. The present invention, however, is not limited to this configuration. According to other embodiments of the present invention, in addition to changing the determination condition of the determination part 233 in accordance with the determination result of the state of doors, the method of calculating evaluation values in the evaluation value calculating part 331 also may be changed in accordance with the determination result of the door state determining part 231.

For example, a data table correlating the received signal strength of a position determination signal S with distance may be prestored in the storage part 34 with respect to each of the open state and the closed state of doors, and the data table that the evaluation value calculating part 331 uses to calculate distances (evaluation values) may be changed in accordance with the determination result of the door state determining part 231. Alternatively, the approximate function that the evaluation value calculating part 331 uses to calculate distances (evaluation values) may differ between the open state and the closed state of doors.

According to an aspect of the present invention, a position determining device is configured to determine the position of a portable device configured to receive one or more radio signals transmitted from one or more antennas inside a vehicle, respectively. The position determining device includes a processor configured to determine the open or closed state of a door of the vehicle for getting in and out of the vehicle, calculate an evaluation value related to the position of the portable device based on the received signal strength of the one or more radio signals at the portable device, and determine that the portable device is positioned inside the vehicle when the evaluation value satisfies a predetermined condition. The processor is configured to change at least one of the predetermined condition and a method of calculating the evaluation value in accordance with the determined open or closed state of the door.

According to this configuration, one or both of the predetermined condition to be satisfied by the evaluation value in order for the portable device to be determined as being positioned inside the vehicle and the method of calculating the evaluation value are changed in accordance with the open or closed state of the door. As a result, even when the received signal strength of a radio signal at the portable device differs between the case where the door is closed and the case where the door is open, the predetermined condition and the method of calculating the evaluation value can be properly set according to the difference in received signal strength. Accordingly, even when the open or closed state of the door changes, the position of the portable device can be correctly determined.

Preferably, the processor may be further configured to calculate one or more distances between the one or more antennas and the portable device as the evaluation value based on the received signal strength of the one or more radio signals transmitted from the one or more antennas, determine that the portable device is positioned inside the vehicle when the one or more distances satisfy a predetermined first condition, in the case of determining that the door is closed as a result of determining the open or closed state of the door, and determine that the portable device is positioned inside the vehicle when the one or more distances satisfy a predetermined second condition different from the predetermined first condition, in the case of determining that the door is open as a result of determining the open or closed state of the door.

According to this configuration, the condition to be satisfied by the distance in order for the portable device to be determined as being positioned inside the vehicle is changed in accordance with the open or closed state of the door. As a result, even when the received signal strength of a radio signal at the portable device differs between the case where the door is closed and the case where the door is open, the condition of the distance can be properly set according to the difference in received signal strength. Accordingly, even when the open or closed state of the door changes, the position of the portable device can be correctly determined.

Preferably, the processor may be further configured to determine the open or closed state of each of multiple doors of the vehicle, the multiple doors including the door, and determine that the portable device is positioned inside the vehicle when the one or more distances satisfy the predetermined second condition, in the case of determining that at least the door among the multiple doors is open as a result of determining the open or closed state of each of the multiple doors, the predetermined second condition being set with respect to each of different combinations of the open or closed states of the multiple doors.

According to this configuration, when the vehicle have multiple doors for getting in and out of the vehicle, the condition to be satisfied by the distance in order for the portable device to be determined as being positioned inside the vehicle is set with respect to each of different combinations of the open or closed states of the doors. As a result, even when the received signal strength of a radio signal at the portable device differs depending on the combination of the open or closed states of the doors, the condition can be properly set according to the difference in received signal strength. Accordingly, even when there is a change in the open or closed states of the doors, the position of the portable device can be correctly determined.

Preferably, the predetermined first condition may include a condition that $d \leq TH1$ or a condition that $d < TH1$, where d is a distance from one of the one or more antennas to the portable device and TH1 is a first threshold, the predetermined second condition may include a condition that $d \leq TH2$ or a condition that $d < TH2$, where d is the distance from the one of the one or more antennas to the portable device and TH2 is a second threshold, and the second threshold may be smaller than the first threshold.

According to this configuration, even when the received signal strength relatively increases with the door being open, a tendency for the portable device to be more likely to be determined as being positioned inside the vehicle is suppressed because the second threshold is smaller than the first threshold.

Preferably, the predetermined first condition may include a condition that $d \leq TH3$ or a condition that $d < TH3$, where d is the sum of distances from two of the one or more antennas to the portable device and TH3 is a third threshold, the predetermined second condition may include a condition that $d \leq TH4$ or a condition that $d < TH4$, where d is the sum of the distances from the two of the one or more antennas to the portable device and TH4 is a fourth threshold, and the fourth threshold may be smaller than the third threshold.

According to this configuration, even when the received signal strength relatively increases with the door being open, a tendency for the portable device to be more likely to be determined as being positioned inside the vehicle is suppressed because the second threshold is smaller than the first threshold.

Preferably, the processor may be further configured to calculate a first Mahalanobis distance and a second Mahalanobis distance as the evaluation value when determining that the door is closed as a result of determining the open or closed state of the door, and calculate a third Mahalanobis distance and a fourth Mahalanobis distance as the evaluation value when determining that the door is open as a result of determining the open or closed state of the door.

The first Mahalanobis distance may be a Mahalanobis distance between a first data group and the received signal strength of the one or more radio signals received at the portable device, wherein the first data group indicates the received signal strength of one or more radio signals from the one or more antennas received at multiple points inside the vehicle with the door being closed. The second Mahalanobis distance may be a Mahalanobis distance between a second data group and the received signal strength of the one or more radio signals received at the portable device, where the second data group indicates the received signal strength of one or more radio signals from the one or more antennas received at multiple points outside the vehicle with the door being closed. The third Mahalanobis distance may be a Mahalanobis distance between a third data group and the received signal strength of the one or more radio signals received at the portable device, where the third data group indicates the received signal strength of one or more radio signals from the one or more antennas received at multiple points inside the vehicle with the door being open. The fourth Mahalanobis distance may be a Mahalanobis distance between a fourth data group and the received signal strength of the one or more radio signals received at the portable device, where the fourth data group indicates the received signal strength of one or more radio signals from the one or more antennas received at multiple points outside the vehicle with the door being open.

The processor may be further configured to determine that the portable device is positioned inside the vehicle when the first Mahalanobis distance is shorter than the second Mahalanobis distance, in the case of determining that the door is closed as a result of determining the open or closed state of the door, and determine that the portable device is positioned inside the vehicle when the third Mahalanobis distance is shorter than the fourth Mahalanobis distance, in the case of determining that the door is open as a result of determining the open or closed state of the door.

According to this configuration, the Mahalanobis distance between a data group of the received signal strength of one or more radio signals at multiple points inside the vehicle and the received signal strength of the one or more radio signals received at the portable device and the Mahalanobis distance between a data group of the received signal strength of one or more radio signals at multiple points outside the vehicle and the received signal strength of the one or more radio signals received at the portable device are calculated using a calculation method according to the open or closed state of the door. As a result, even when the received signal strength of a radio signal at the portable device differs between the case where the door is closed and the case where the door is open, the Mahalanobis distances are calculated using a proper calculation method adapted to the difference in received signal strength. Accordingly, the position of the portable device is correctly determined.

Preferably, the door may be a slidable door, and the processor may be configured to determine the open or closed state of the slidable door.

According to this configuration, even when there is a change in the open or closed state of the door in the case where the door slides to be opened or closed, the position of the portable device can be correctly determined.

According to an aspect of the present invention, it is possible to make an accurate determination even when the open or closed state of a door for getting in and out of a vehicle changes in the case of determining the position of a portable device in accordance with the received signal strength of a radio signal transmitted from an antenna inside the vehicle.

What is claimed is:

1. A position determining device configured to determine a position of a portable device configured to receive one or more radio signals transmitted from one or more antennas inside a vehicle, respectively, the position determining device comprising:
   a memory; and
   a processor coupled to the memory, and configured to
   determine an open or closed state of a door of the vehicle for getting in and out of the vehicle by receiving a signal from a door sensor configured to detect the open or closed state of the door;
   calculate an evaluation value related to the position of the portable device based on a received signal strength of the one or more radio signals at the portable device; and
   determine that the portable device is positioned inside the vehicle when the evaluation value satisfies a predetermined condition,
   wherein the processor is configured to change at least one of the predetermined condition and a method of calculating the evaluation value in accordance with the determined open or closed state of the door.

2. The position determining device as claimed in claim 1, wherein the processor is further configured to
   calculate one or more distances between the one or more antennas and the portable device as the evaluation value based on the received signal strength of the one or more radio signals transmitted from the one or more antennas;
   determine that the portable device is positioned inside the vehicle when the one or more distances satisfy a predetermined first condition, in a case of determining that the door is closed as a result of determining the open or closed state of the door; and
   determine that the portable device is positioned inside the vehicle when the one or more distances satisfy a predetermined second condition different from the predetermined first condition, in a case of determining that the door is open as a result of determining the open or closed state of the door.

3. The position determining device as claimed in claim 2, wherein the processor is further configured to
   determine the open or closed state of each of a plurality of doors of the vehicle, the plurality of doors including the door; and
   determine that the portable device is positioned inside the vehicle when the one or more distances satisfy the predetermined second condition, in a case of determining that at least the door among the plurality of doors is open as a result of determining the open or closed state of each of the plurality of doors, the predetermined second condition being set with respect to each of different combinations of the open or closed states of the plurality of doors.

4. The position determining device as claimed in claim 2, wherein
   the predetermined first condition includes a condition that d≤TH1 or a condition that d<TH1, where d is a distance from one of the one or more antennas to the portable device and TH1 is a first threshold, and
   the predetermined second condition includes a condition that d≤TH2 or a condition that d<TH2, where d is the distance from the one of the one or more antennas to the portable device and TH2 is a second threshold, the second threshold being smaller than the first threshold.

5. The position determining device as claimed in claim 2, wherein
   the predetermined first condition includes a condition that d≤TH3 or a condition that d<TH3, where d is a sum of distances from two of the one or more antennas to the portable device and TH3 is a third threshold, and the predetermined second condition includes a condition that d≤TH4 or a condition that d<TH4, where d is the sum of the distances from the two of the one or more antennas to the portable device and TH4 is a fourth threshold, the fourth threshold being smaller than the third threshold.

6. The position determining device as claimed in claim 1, wherein the processor is further configured to calculate a first Mahalanobis distance and a second Mahalanobis distance as the evaluation value when determining that the door is closed as a result of determining the open or closed state of the door; and calculate a third Mahalanobis distance and a fourth Mahalanobis distance as the evaluation value when determining that the door is open as a result of determining the open or closed state of the door, the first Mahalanobis distance is a Mahalanobis distance between a first data group and the received signal strength of the one or more radio signals received at the portable device, the first data group indicating a received signal strength of one or more radio signals from the one or more antennas received at a plurality of points inside the vehicle with the door being closed, the second Mahalanobis distance is a Mahalanobis distance between a second data group and the received signal strength of the one or more radio signals received at the portable device, the second data group indicating a received signal strength of one or more radio signals from the one or more antennas received at a plurality of points outside the vehicle with the door being closed, the third Mahalanobis distance is a Mahalanobis distance between a third data group and the received signal strength of the one or more radio signals received at the portable device, the third data group indicating a received signal strength of one or more radio signals from the one or more antennas received at a plurality of points inside the vehicle with the door being open, the fourth Mahalanobis distance is a Mahalanobis distance between a fourth data group and the received signal strength of the one or more radio signals received at the portable device, the fourth data group indicating a received signal strength of one or more radio signals from the one or more antennas received at a plurality of points outside the vehicle with the door being open, and the processor is further configured to determine that the portable device is positioned inside the vehicle when the first Mahalanobis distance is shorter than the second Mahalanobis distance, in a case of determining that the door is closed as a result of determining the open or closed state of the door; and determine that the portable device is positioned inside the vehicle when the third Mahalanobis distance is shorter than the fourth Mahalanobis distance, in a case of determining that the door is open as a result of determining the open or closed state of the door.

7. The position determining device as claimed in claim 1, wherein the door is a slidable door, and the processor is configured to determine the open or closed state of the slidable door.

8. A position determining method for determining a position of a portable device configured to receive one or more radio signals transmitted from one or more antennas inside a vehicle, respectively, the position determining method comprising:

determining, by a processor, an open or closed state of a door of the vehicle for getting in and out of the vehicle by receiving a signal from a door sensor configured to detect the open or closed state of the door;

calculating, by the processor, an evaluation value related to the position of the portable device based on a received signal strength of the one or more radio signals at the portable device; and determining, by the processor, that the portable device is positioned inside the vehicle when the evaluation value satisfies a predetermined condition, wherein at least one of the predetermined condition and a method of calculating the evaluation value is changed by the processor in accordance with the open or closed state of the door determined by said determining the open or closed state of the door.

9. The position determining method as claimed in claim 8, wherein said calculating the evaluation value includes calculating one or more distances between the one or more antennas and the portable device as the evaluation value based on the received signal strength of the one or more radio signals transmitted from the one or more antennas, and said determining that the portable device is positioned inside the vehicle includes determining that the portable device is positioned inside the vehicle when the one or more distances satisfy a predetermined first condition, in a case where said determining the open or closed state of the door determines that the door is closed; and determining that the portable device is positioned inside the vehicle when the one or more distances satisfy a predetermined second condition different from the predetermined first condition, in a case where said determining the open or closed state of the door determines that the door is open.

10. The position determining method as claimed in claim 8, wherein said calculating the evaluation value includes calculating a first Mahalanobis distance and a second Mahalanobis distance as the evaluation value when said determining the open or closed state of the door determines that the door is closed; and calculating a third Mahalanobis distance and a fourth Mahalanobis distance as the evaluation value when said determining the open or closed state of the door determines that the door is open, the first Mahalanobis distance is a Mahalanobis distance between a first data group and the received signal strength of the one or more radio signals received at the portable device, the first data group indicating a received signal strength of one or more radio signals from the one or more antennas received at a plurality of points inside the vehicle with the door being closed, the second Mahalanobis distance is a Mahalanobis distance between a second data group and the received signal strength of the one or more radio signals received at the portable device, the second data group indicating a received signal strength of one or more radio signals from the one or more antennas received at a plurality of points outside the vehicle with the door being closed, the third Mahalanobis distance is a Mahalanobis distance between a third data group and the received signal strength of the one or more radio signals received at the portable device, the third data group indicating a received signal strength of one or more radio signals from the one or more antennas received at a plurality of points inside the vehicle with the door being open, the fourth Mahalanobis distance is a Mahalanobis distance between a fourth data group and the received signal strength of the one or more radio signals received at the portable device, the fourth data group indicating a received signal strength of one or more radio signals from the one or more antennas received at a plurality of points outside the vehicle with the door being open, and said determining that the portable device is positioned inside the vehicle includes determining that the portable device is positioned inside the vehicle when the first Mahalanobis distance is shorter than the second Mahalanobis distance, in a case where said determining the open or closed state of the door determines that the door is closed; and determining that the portable device is positioned inside the vehicle when the third Mahalanobis distance is shorter than the fourth Mahalanobis distance, in a case where said determining the open or closed state of the door determines that the door is open.

11. A non-transitory computer-readable recording medium having stored therein a program for causing a computer to execute the position determining method as set forth in claim 8.

12. A keyless entry system, comprising:

a vehicle-side device configured to transmit one or more radio signals from one or more antennas inside a vehicle, respectively, and receive a response signal respondent to the one or more radio signals; and a portable device configured to receive the one or more radio signals and transmit the response signal, the response signal including an evaluation value calculated in accordance with a received signal strength of the one or more radio signals, wherein the portable device includes a first memory; and a first processor coupled to the first memory, and configured to calculate the evaluation value based on the received signal strength of the one or more radio signals transmitted from the one or more antennas, the evaluation value indicating one or more distances between the one or more antennas and the portable device, and wherein the vehicle-side device includes a second memory; and a second processor coupled to the second memory, and configured to determine an open or closed state of a door of the vehicle for getting in and out of the vehicle by receiving a signal from a door sensor configured to detect the open or closed state of the door; and determine that the portable device is positioned inside the vehicle when the one or more distances satisfy a predetermined first condition, in a case of determining that the door is closed as a result of determining the open or closed state of the door; and determine that the portable device is positioned inside the vehicle when the one or more distances satisfy a predetermined second condition different from the predetermined first condition, in a case of determining that the door is open as a result of determining the open or closed state of the door.

13. A keyless entry system, comprising:

a vehicle-side device configured to transmit one or more radio signals from one or more antennas inside a vehicle, respectively, and receive a response signal respondent to the one or more radio signals; and a portable device configured to receive the one or more radio signals and transmit the response signal, the response signal including information on a received signal strength of the one or more radio signals, wherein the vehicle-side device includes a memory; and a processor coupled to the memory, and configured to determine an open or closed state of a door of the vehicle for getting in and out of the vehicle by receiving a signal from a door sensor configured to detect the open or closed state of the door;

calculate an evaluation value related to a position of the portable device based on the received signal strength of the one or more radio signals indicated by the information included in the response signal; and determine that the portable device is inside the vehicle when the evaluation value satisfies a predetermined condition, wherein the processor is configured to calculate a first Mahalanobis distance and a second Mahalanobis distance as the evaluation value when determining that the door is closed as a result of determining the open or closed state of the door; and calculate a third Mahalanobis distance and a fourth Mahalanobis distance as the evaluation value when determining that the door is open as a result of determining the open or closed state of the door, wherein the first Mahalanobis distance is a Mahalanobis distance between a first data group and the received signal strength of the one or more radio signals indicated by the information included in the response signal, the first data group indicating a received signal strength of one or more radio signals from the one or more antennas received at a plurality of points inside the vehicle with the door being closed, wherein the second Mahalanobis distance is a Mahalanobis distance between a second data group and the received signal strength of the one or more radio signals indicated by the information included in the response signal, the second data group indicating a received signal strength of one or more radio signals from the one or more antennas received at a plurality of points outside the vehicle with the door being closed, wherein the third Mahalanobis distance is a Mahalanobis distance between a third data group and the received signal strength of the one or more radio signals indicated by the information included in the response signal, the third data group indicating a received signal strength of one or more radio signals from the one or more antennas received at a plurality of points inside the vehicle with the door being open, wherein the fourth Mahalanobis distance is a Mahalanobis distance between a fourth data group and the received signal strength of the one or more radio signals indicated by the information included in the response signal, the fourth data group indicating a received signal strength of one or more radio signals from the one or more antennas received at a plurality of points outside the vehicle with the door being open, and wherein the processor is configured to determine that the portable device is positioned inside the vehicle when the first Mahalanobis distance is shorter than the second Mahalanobis distance, in a case of determining that the door is closed as a result of determining the open or closed state of the door; and determine that the portable device is positioned inside the vehicle when the third Mahalanobis distance is shorter than the fourth Mahalanobis distance, in a case of determining that the door is open as a result of determining the open or closed state of the door.

* * * * *